Patented Nov. 14, 1933

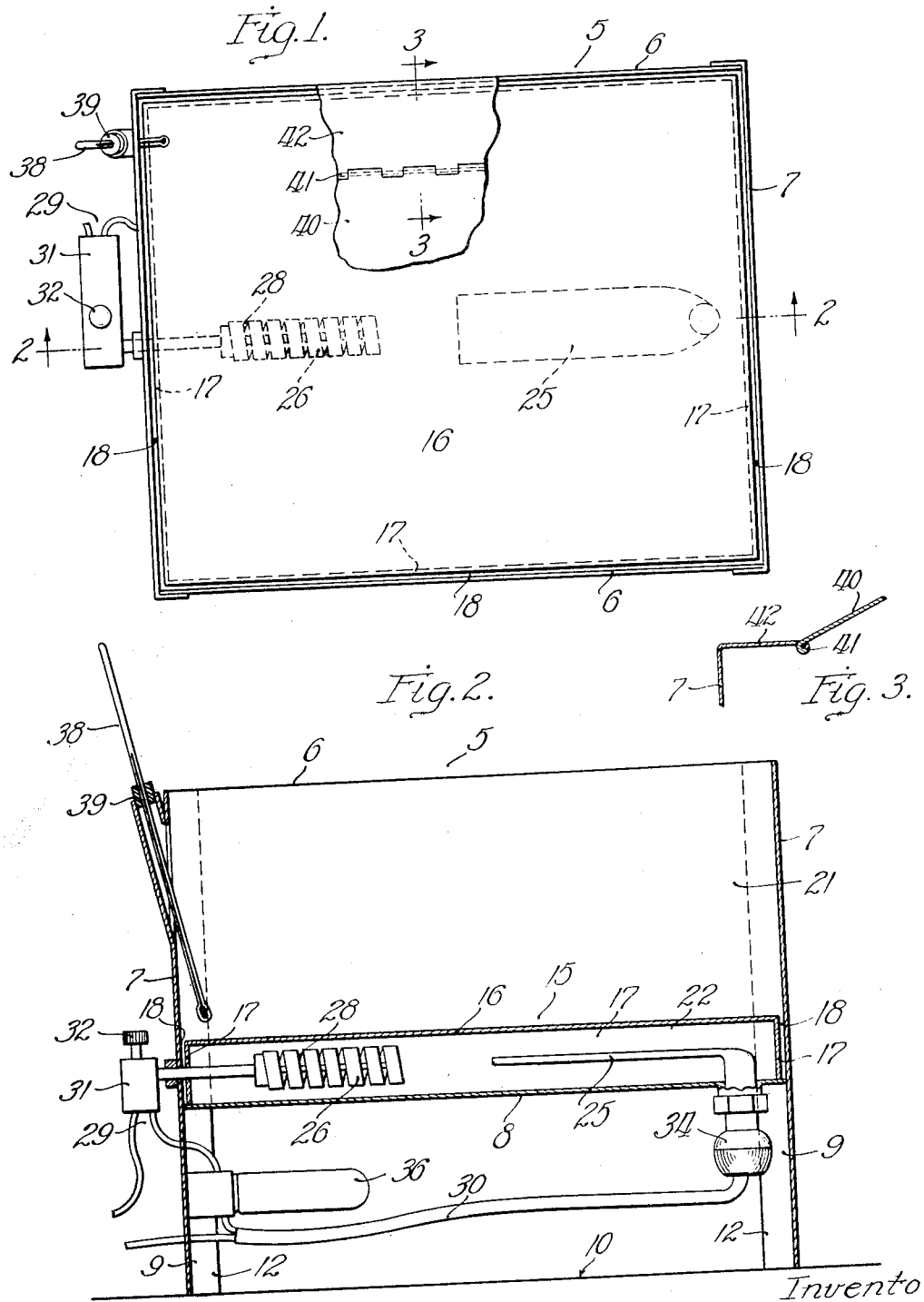

1,935,578

UNITED STATES PATENT OFFICE 1,935,578

BATH DEVICE AND METHOD OF HEATING AND CONTROL THEREFOR

William S. Rice, Washington, D. C., assignor to Coe Laboratories, Inc., Chicago, Ill., a corporation of Illinois Application December 29, 1928
Serial No. 329,240

2 Claims. (Cl. 126—344)

This invention relates to a bath device and method of heating and control therefor.

The device of the present invention is adapted for use as a dental investment bath. It is not, however, limited to such use only, but may be employed as a water, steam, or other fluid bath, wherever suitable or desired.

Heretofore, owing to the physical law of warm water rising to the top, it has been extremely difficult to construct a bath in which a constant temperature could be maintained throughout. Stirring devices for stirring the water or other fluid content of the bath have been resorted to, in an effort to obtain a more uniform and constant temperature throughout the bath. These devices have the disadvantages of increasing the cost, complicating the construction, and increasing the bulk of the device and the amount of space required, also the further disadvantage that such a combination requires an available electricity outlet, or the use of some other driving means or source of power for the stirring device, such as a water motor or the like.

Without the stirring device, the temperature through the bath has not been uniform and a constant temperature throughout has not been maintained.

The object of the present invention is the provision of a bath, heating method and control, in which the bath is maintained at a uniform and constant temperature throughout, without the use of the stirring devices, additional motors, and other appliances heretofore resorted to.

Another object is the provision of a generally improved and simplified device that may be economically produced.

The invention is illustrated in the accompanying drawing, in which:

Figure 1 is a top plan view of a device embodying the present invention;

Figure 2 is a vertical section, taken on the line 2—2 of Figure 1; and

Figure 3 is a fragmentary vertical section, taken on the line 3—3 of Figure 1, and showing fragmentarily one form of cover for the device.

Referring to the drawing, the particular embodiment of the invention selected for illustration comprises a generally rectangular vessel 5, having upright side walls 6, end walls 7, and a bottom 8. This vessel 5 may be suitably supported by legs 9, which preferably extend downwardly to space the bottom 8 of the vessel upwardly from the supporting surface 10, as shown.

The supports 9 are shown as downward extensions of the end walls 7, with the angular end flanges 12, but it is to be understood that the particular showing is more or less diagrammatic and that the particular construction of the bath and supports therefor may be varied widely. The bath may be made up of suitable sheet metal, for example, the size of the bath may, likewise, be varied widely.

Within the bath or vessel 5, I provide an inner inverted pan 15, having a wall 16, which is disposed horizontally and forms a false bottom within the bath when the inverted pan 15 is in position therein. The wall 16 of the pan 15 is provided marginally with down-turned flanges 17, the lower edges of which rest upon and support the pan upon the bottom wall 8 of the bath. The fit marginally of the pan 15 within the bath is, preferably, relatively loose as exaggerated at 18, so that as the water or other liquid is placed in the bath above the wall 16, as indicated at 21, it will seep or pass marginally around the pan 15 and fill the confined space 22 beneath the false bottom 16 and between the false bottom 16 and the bottom wall 8.

The confined body of fluid within the space 22 substantially completely underlies the bottom of the fluid body 21, constituting the bath proper and disposed within this space 22 is a suitable heater 25, preferably a suitable lagless immersion heater and a suitable control, preferably an adjustable immersion control unit 26. Other forms of control and heater units may be employed and it is to be understood, therefore, that those shown are merely illustrative. The particular heater 25 and control 26 constitute per se no part of the present invention and, in that heaters and controls suitable for this purpose are now on the market and well understood in the art, I shall not describe the details further herein. Suffice it to say that the particular control shown comprises a bimetallic helix 28, suitably connected at 29, into the electrical heater circuit 30 shown, and provided with means housed at 31 and adapted to be set by means of a finger-piece 32 to maintain automatically any desired temperature. The particular temperature to be maintained may be obtained by adjusting the finger-piece 32.

The particular heater 25 shown is in the form of a lagless immersion heater, and although in the form of an electrical heater connected into the heating circuit 30, it is to be understood that the bath may be heated by gas, alcohol, or in any other suitable or preferred manner. Disposal of the heater outside the space 22 instead of within same, as shown, is also contemplated. The heater circuit 30 is shown as being detachably connected at 34 with the downward angular extension of the heater element 25 and although the control element 26 is shown as entering the space 22 through one end 7 of the bath and the adjacent flange 17, it is to be understood that the control may enter from the top, side, bottom, or otherwise, as desired.

The particular manner or direction of entry of the heater 25 into the space 22 may, likewise, be varied, the important aspects of the present invention residing in the provision of the underlying confined heating space 22 with the heater and control therein and the manner in which the bath is maintained at uniform and constant temperature throughout thereby, and without residual temperatures in the body of fluid confined in the space 22 and forming, in effect, the heater for the bath proper 21.

A pilot light 36 may be provided for indicating to the operator that the heater and regulator are functioning properly and the light may assist in setting for any temperature, as well understood in the art. A thermometer 38 is shown as entering and supported at 39 and extending down into the bath at its lower end and out from the bath at its upper end for convenient reading of the temperature of the bath externally thereof.

In operation, the fluid confined within the space 22 forms, in effect, a heater for the liquid bath 21 in the bath proper above the bottom wall 16. This heater formed by the fluid confined within the space 22 has the advantage over a direct application of an electrical heater or a gas, alcohol, or other heater or burner to the bottom 16, in that it does not accumulate temperatures in excess of those desired and it maintains the temperature desired constant. By being confined, the body of liquid or other fluid within the space 22 is heated uniformly from the heater 25 and the temperature or heat from this confined underlying body rises uniformly through the bath 21, heating the same uniformly throughout.

"Cold" or "hot" pockets at different levels or other different parts of the bath 21 are avoided and, when the temperature is reached in the bath at which further heat is not desired, the control 26 automatically opens the heater circuit. The particular temperature at which the control is effective may be regulated or varied, as already pointed out. The heating fluid body within the space 22 dissipates its heat quickly to the fluid bath proper 21 and there is, therefore, no accumulation of temperatures in excess of that desired after the heater is discontinued. The present invention, therefore, differs from the mere disposition of a gas or other burner, for example, beneath the entire bottom of the bath, in that not only is the bath heated more uniformly, but residual temperatures are eliminated and a constant temperature throughout is automatically maintained.

It will be observed that, although the relatively loose fit of the false bottom or pan 15 within the bath permits the liquid of the bath to pass down into and fill the space 22, the fit is preferably such that the heated liquid or fluid beneath the false bottom 16, is prevented from escaping to the bath proper 21 or upper liquid level, which would leave a cold strata at the bottom and the hottest at the top, with varying ranges of temperature intervening. Of course, instead of the loose fit referred to, other means may be provided for permitting a restricted passage of the overlying liquid into the space 22 to fill the same and which means will, at the same time, prevent the heated liquid beneath the false bottom 16 from materially escaping to the upper liquid level or bath proper 21.

As already pointed out, the bath of the present invention is suitable for use as a dental investment bath, but may be used either as a steam bath or as a water bath, set for any desired temperature and wherever such a bath is desired or suitable. Of course, liquids other than water may be employed in the bath, and particularly where higher temperatures are desired.

The bath is preferably provided with a cover 40, which may be hinged at 41 (Figs. 1 and 3) to a horizontal top wall portion 42, for example, which may extend along one side of the bath and be relatively fixed or stationary to form a supporting shelf or ledge for investment flasks or other apparatus used with the bath.

I claim:

1. In combination, a vessel adapted to contain a liquid bath, a false bottom disposed within said vessel and forming a space for confining a body of fluid beneath the bath and substantially separated from the bath, a heater disposed outside the bath and directly within the space formed by said false bottom, and a thermostatic device for controlling said heater in response to the temperature of the fluid confined in the space beneath the bath, said thermostatic control device being also disposed outside the bath and directly within the space formed by said false bottom, said false bottom serving as a heat transmitting surface between said confined body of fluid and said liquid bath and comprising a generally horizontal wall flanged marginally and having a loose fit within the vessel to permit the passage of liquid from said bath to said space.

2. In combination, a vessel adapted to contain a liquid bath and having a bottom wall and side walls, an imperforate flat false bottom disposed horizontally within said vessel with its periphery extending to the inner periphery of the side walls, said false bottom being spaced from the bottom of the vessel and allowing restricted communication between the liquid bath and the space between the bottom of the vessel and the false bottom solely along the periphery of the false bottom whereby a body of liquid is confined below the liquid bath and substantially separated from the bath, a heater disposed outside the bath and directly within the space between the false bottom and the bottom of the vessel, and a thermostatic device for controlling said heater in response to the temperature of the liquid confined in the space beneath the false bottom, said thermostatic control device being also disposed outside the bath and directly within the space formed by said false bottom.

WILLIAM S. RICE.